Sept. 24, 1935.  H. R. PRESCOTT  2,015,410
VIBRATING SYSTEM
Filed Feb. 5, 1934
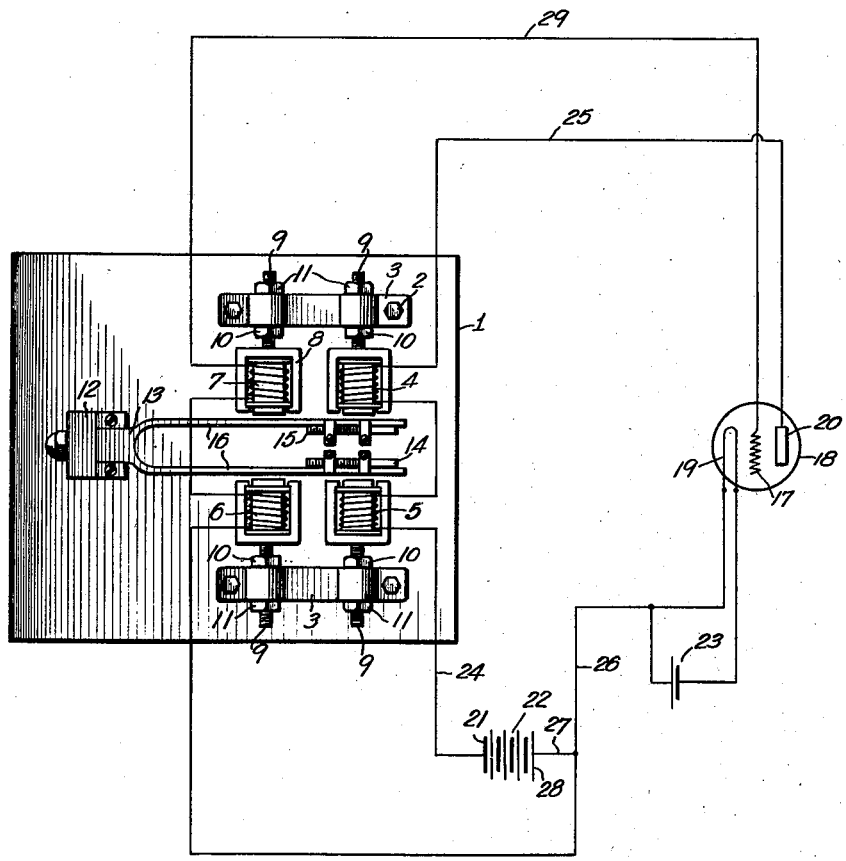
INVENTOR
Harold R. Prescott
BY Thos. F. Seafield
ATTORNEY Patented Sept. 24, 1935

2,015,410

UNITED STATES PATENT OFFICE 2,015,410

VIBRATING SYSTEM

Harold R. Prescott, Ponca City, Okla., assignor to Continental Oil Company, Ponca City, Okla., a corporation of Delaware Application February 5, 1934, Serial No. 709,897

5 Claims. (Cl. 84—409)

My invention relates to vibrating systems and more particularly to vibrating systems which will maintain a high degree of accuracy through wide variations in temperature.

In many arts, vibrating systems of known frequency are used in connection with timing. As one example of this, though it is to be understood I do not wish to be limited in my invention to any particular application of my system, in making geological explorations with seismic waves, the times of arrival of the transmitted seismic waves and reflected seismic waves must be measured with extremely high accuracy in order to obtain measurements for example in thousandth parts of a second, a vibrating system whose frequency is a hundred vibrations per second may be used to mark the record on which the seismic waves are recorded so that the times may be accurately determined. In ballistic work, accurate time measurements are necessary to determine high velocities.

Changes of temperature have a marked effect upon the frequency of timing systems and especially those using metallic vibrating members. The frequency of a metallic vibrating member will vary with the temperature. When the temperature drops, the frequency of vibration of the metallic vibrating member, as for example a tuning fork, will increase due primarily to the thermo-elastic coefficient which causes the member to have an increased stiffness to deformation. The frequency will also increase as the temperature lowers due to the shortening of the vibrating member. It will be seen that the thermo-elastic coefficient will determine primarily the change in frequency of vibration of a metallic tuning fork. It has been attempted to construct tuning forks of material having a low thermo-elastic coefficient or to use a bimetal construction in an attempt to compensate for changes in frequency due to temperature. It is a stubborn fact, however, that a tuning fork of high grade steel will give a more stable frequency of vibration than any other material provided the temperature is maintained constant. It has also been suggested to use a temperature controlled compartment for tuning forks. This necessitates additional equipment and bulk which is undesirable when making observations in the field, as for example is necessary in geological exploration.

One object of my invention is to provide a vibrating system which will maintain a substantially constant frequency over a wide range of temperature.

Another object of my invention is to provide a vibrating system in which changes of frequency of the vibrating member are compensated for in a novel, simple, and efficient manner.

Another object of my invention is to provide a vibrating system having a frequency-temperature factor which may be predetermined.

Other and further objects of my invention will appear from the following description.

The accompanying drawing is a schematic view showing a vibrating system embodying one mode of carrying out my invention.

Referring now to the accompanying drawing, I provide a base 1 which may be made out of aluminum, brass, aluminum copper alloy, nickel, steel or any other suitable material, as will be hereinafter more fully disclosed.

Rigidly secured to the base 1 in any suitable manner, as for example by bolts 2, are pedestals 3. If desired, the pedestals may be made integral with the base 1. Secured to pedestals 3 in any suitable, adjustable manner are electro-magnets 4, 5, 6, and 7. The electro-magnets may have a core of soft iron which does not retain permanent magnetism or the core may be a permanent magnet. In the form shown in the drawing, the electro-magnets are provided with yokes 8, carrying studs 9. Nuts 10 and 11 provide an adjusting means as well as a securing means for the electro-magnets to the base 1. On any suitable standard 12 I mount a vibrating member such as tuning fork 13. Adjusting screws 14 and 15 are carried by the tuning fork to enable its frequency to be adjusted within certain limits. It is to be understood, of course, that any suitable mounting means which will allow the distance of the electro-magnets 4, 5, 6, and 7 from the prongs 16 of the tuning fork 13 to be adjusted and at the same time form a rigid connection between the electro-magnets and the base 1, may be employed.

The grid 17 of the thermionic tube 18 is connected to the filament 19 of the tube through electro-magnets 7 and 6 as can readily be appreciated by reference to the drawing. The electro-magnets 6 and 7 may be called "exciter coils". The plate 20 of the thermionic tube 18 is connected to the positive terminal 21 of battery 22 through electro-magnets 4 and 5 which I prefer to call "driving coils". The filament 19 is heated from battery 23. Current flows from positive terminal 21 of battery 22 through conductor 24, through the driving coils 5 and 4, which are connected in series through conductors 25 to the plate 20, to the filament 19, through conductors 26 and 27 to the negative pole of the battery 28. The energization of driving coils 4 and 5 attracts the prongs 16 of the tuning fork 13. The movement of the prongs 16 in the fields of exciting coils 6 and 7 deforms the path of magnetic flux inducing voltage changes in the grid circuit which are impressed through conductor 29 to the grid 17. The variation of voltages upon the grid 17 will tend to be in phase with the net frequency of the fork 13. The plate current variations will be controlled by the grid voltage variations in a manner well known to the art. Inasmuch as the plate current controls the driving coils 4 and 5, it will be readily appreciated that the system will maintain a stable frequency of vibration of a tuning fork provided the temperature remains constant. In the system just described, the placing of the coils closer to the prongs 16 lowers the frequency of vibration. As the electro-magnets are placed closer to the prongs of the fork, the fork acts as though greater mass were added.

If the temperature drops, for example, the metal of the base member 1 will contract. In addition to this the tuning fork will have an increased stiffness to deformation as determined by its thermo-elastic coefficient. The increased stiffness as well as the contraction of the tuning fork itself tends to increase the frequency of vibration. The contraction of the base with the electro-magnets rigidly secured thereto tends to decrease the inter-magnet space and, at the same time, brings the magnets closer to the prongs 16 of the tuning fork. Decreasing the gap between the magnet and the vibrating member, as was pointed out above, tends to decrease the frequency of vibration. Upon a rise in temperature, the frequency of the fork tends to decrease and the gap between the magnets and the prongs tends to lengthen, which in turn tends to increase the frequency of vibration. It will be seen that the temperature effect in the system disclosed is such that compensation may be effected, providing the linear coefficient of expansion of the tuning fork and the base be sufficiently different and that the gap at a given temperature be adjusted for the desired frequency. I have found that it is desirable to have a base of metal having a greater linear coefficient of expansion than that of the metal of the tuning fork. If the tuning fork, for example, is made of steel having 1.2% of carbon, which steel has a linear coefficient of expansion of .0000105 or of a nickel steel containing 10% nickel, which steel has a linear coefficient of expansion of .0000130, the base may be made out of aluminum having a coefficient of expansion of .00001835, brass having a linear coefficient of expansion of .00001875, aluminum copper alloy having 10% copper, which alloy has a linear coefficient of expansion of .0000223, or nickel and steel containing 20% nickel, which steel has a linear coefficient of expansion of .0000195. It will be understood, of course, that for any given base, the initial gap between the prongs of the tuning fork and the coils must be adjusted a predetermined distance such that the differential spacing, caused by temperature changes, between the electro-magnets and the tuning fork prongs, will accomplish the desired compensation.

It will also be understood that the distance between pedestals 3, which are mounted on a base, determines the length acting to control the gap between the electro-magnets and the prongs 16 of the tuning fork. The inter-pedestal distance will vary with the different metals used, it being obvious of course that the lower the coefficent of expansion the longer must be the inter-pedestal space, while the higher the linear coefficient of expansion of the metal of the base, the shorter can the inter-pedestal distance be.

In operation, a device made in accordance with my invention will maintain a substantially uniform frequency regardless of normal temperature variations encountered in making field observations. Increases in temperature tend to decrease the frequency of vibration of the tuning fork. This, in turn, is compensated for by an increase in the gap between the prongs of the tuning fork and the coils, which serves to increase the frequency sufficiently to overcome the decrease in frequency resulting from an increase in temperature. The mean variation in frequency over a temperature range from 40° F. to 100° F. using my disclosed scheme, will be less than 5% of the normal variation in frequency using a tuning fork system not employing my scheme.

In many applications, a timing system is desirable having a temperature coefficient such that it will compensate for the error in associated apparatus introduced as a result of temperature variations. For example, suppose a given set of observations was made from apparatus which, for every degree change in temperature, reacted to the extent of an error of one percent of the original timing observation. A timing system of my invention could be so adjusted to have an exactly equal temperature coefficent. In this manner, the net result, if my invention were used, would be to yield correct observations independent of temperature variations without the troublesome and tedious procedure of correcting for temperature errors.

It will be apparent that selecting materials having sufficiently divergent linear coefficients of expansion for the base and the tuning fork and adjusting the original inter-coil distance and the original gap between the coils and the prongs of the tuning fork, that a timing system may be secured having any desired temperature coefficient. A system may be secured which vibrates more rapidly as the temperature increases, one which vibrates more slowly as the temperature increases, or one which remains substantially constant, regardless of temperature changes.

It will be observed that the figure is purely diagrammatic. In practice it is assembled to use an amplifying unit composed of several thermionic tubes in order to obtain a plate current of sufficient amperage. The figure, however, discloses the system so that those skilled in the art may employ my invention, it being understood that the grid is connected to the input of the amplifying unit, while the plate is connected to the output of the amplifying unit. The vibrating system shown may be employed in many different ways. A galvanometer carrying a mirror may be interposed in the plate circuit and the vibrations recorded photographically. A stylus may be carried directly by the tuning fork. A magnetic stylus may be inductively connected to the plate circuit in a manner well understood by the art.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A vibrating system comprising in combination a base, a vibrating member mounted on said base, electro-magnetic means for vibrating said member mounted on said base, said magnetic means being positioned at predetermined distance from said vibrating member, said vibrating member and said base having coefficients of linear expansion such that a change in temperature will change said predetermined distance to compensate for the change in frequency occasioned by the thermo-elastic coefficient of said vibrating member whereby the frequency of the vibrations of said vibrating member is rendered substantially independent of changes in temperature.

2. A vibrating system rendered substantially independent of frequency changes due to temperature variations comprising in combination, a base, a vibrating member mounted thereon, electro-magnetic means for vibrating said vibrating member, a mounting on said base for said electro-magnetic means, said mounting being positioned at a predetermined distance from said vibrating member, said base being of material having a selected coefficient of linear expansion to compensate for changes of frequency of the vibrating member.

3. A vibrating system comprising in combination a vibrating member, a mounting, a vibratory means on said mounting positioned at a predetermined distance from said vibrating member, the linear coefficient of expansion of said mounting and vibrating member being such as to compensate for frequency changes due to temperature variations.

4. A vibrating system having a frequency responsive to temperature changes in a predetermined manner, including in combination, a vibrating member, a base, an electro-magnetic vibratory means mounted on said base at a predetermined distance from said vibrating member, said distance and the linear coefficient of expansion of said base and said vibrating member being such that a given increment of temperature produces a predetermined change of frequency of the vibrations.

5. A vibrating system including in combination a base, a vibrating member, an exciter electromagnet mounted on said base, a thermionic amplifying unit, said exciter electro-magnet being connected with the input of said unit, a driving electro-magnet mounted on said base at a predetermined distance from said vibrating member connected with the output of said unit, the coefficients of linear expansion of said vibrating member and said base being such as to compensate for changes of frequency occasioned by temperature variations.

HAROLD R. PRESCOTT.